Nov. 25, 1952 — D. G. GRISWOLD — 2,619,110
PILOT CONTROLLED GATE AND BY-PASS VALVE
Filed April 10, 1947 — 10 Sheets-Sheet 1

Inventor
Donald G. Griswold
By Bacon + Thomas
Attorneys

Nov. 25, 1952 — D. G. GRISWOLD — 2,619,110
PILOT CONTROLLED GATE AND BY-PASS VALVE
Filed April 10, 1947 — 10 Sheets-Sheet 7

Inventor
Donald G. Griswold
By Bacon + Thomas
Attorneys

Patented Nov. 25, 1952

2,619,110

UNITED STATES PATENT OFFICE 2,619,110

PILOT CONTROLLED GATE AND BY-PASS VALVE

Donald G. Griswold, El Monte, Calif.

Application April 10, 1947, Serial No. 740,670

12 Claims. (Cl. 137—488)

The present invention relates to control means for controlling the opening and closing of large valves, and particularly valves of the type which are power operated, i. e., either cylinder or fluid motor operated.

One of the important features of the present invention is a pilot-controlled, fluid pressure operable, pressure equalizing valve arranged to bypass fluid around the closure member of a main valve to establish communication between the inlet and outlet sides of said main valve, whereby to relieve the pressure on one side of the closure member of said main valve, and in the case of a gate valve, on the inlet side of the gate, to substantially balance the pressures in the inlet and outlet chambers of the main valve before opening of the main valve is attempted. Such relief of inlet pressure, or substantial balancing of the pressures on the opposite sides of the gate, reduces the lateral thrust pressure on the gate so that the force necessary to actuate the main valve to effect opening of the same is very much less than that which would normally be required. This makes it possible to utilize a power cylinder, or fluid motor, that is much smaller in size than would normally be required to operate any given size main valve. In addition, valve seat wear is reduced to a minimum and a substantial net savings in the initial cost of the equipment is effected.

A cylinder and fluid motor are considered equivalents for the purposes of the present invention, but for illustrative purposes (in compliance with Section 4888 R. S.) only a cylinder has been disclosed herein. The alternate admission of operating fluid under pressure into and the exhaust of such fluid from one end of the cylinder, and the corresponding exhaust and admission of operating fluid from and into the opposite end of the cylinder may be controlled by a number of individual fluid pressure operated valves but most conveniently controlled by a suitable or conventional fluid pressure operable four-way valve. In any event, the valve means employed is controlled by the same pilot valve that controls the aforementioned fluid pressure operable, pressure equalizing valve.

Other notable features of the invention reside in a modified form of control means capable of automatically effecting opening of the main valve in response to pressure changes on the inlet side of said main valve, for example; and in a manually controlled pilot valve for enabling the main valve to be opened to any extent desired and then positively locked in the desired open position.

The principal object of the invention is to provide control means, particularly for large size valves, which will enable the same to be operated by power means of minimum capacity, preferably controlled from a remote position, although it is to be understood that the invention is not limited with respect to the size of the valve controlled nor to its being remotely controlled.

Another object of the invention is to provide control means for a power operated main valve in which the pressure is substantially balanced on the opposite sides of the closure member of the main valve prior to the actuation of the power operated means for effecting opening of the main valve.

Another object of the invention is to provide control means of the foregoing character including manual means enabling the main valve to be locked in any desired open position of adjustment.

Still another object of the invention is to provide control means of the general character described which is actuated automatically by pressure-responsive means in accordance with changes in pressure on at least one side of the main valve.

Other objects and features of the invention will be apparent from the following description taken in conjunction with the accompanying drawings, in which.

Figure 1:
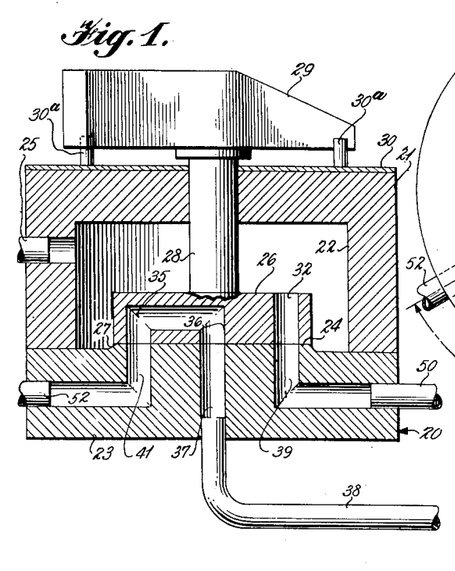
Fig. 1 is a diagrammatic sectional view, drawn to exaggerated scale and taken on the line 1—1 of Fig. 2, of a manually operated pilot valve for simultaneously controlling a pressure fluid operable, pressure equalizing valve and a pressure fluid operable four-way valve associated with a main valve.
Figure 2:
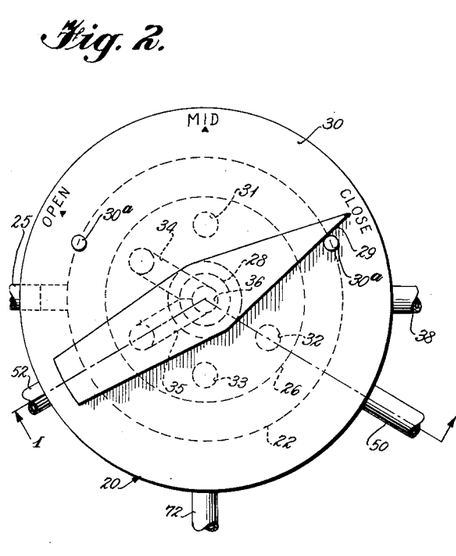
Fig. 2 is a plan view of the pilot valve shown in Fig. 1.

Referring now to Figs. 1 and 2 of the drawings, the pilot valve diagrammatically shown therein is generally identified by the numeral 20 and includes a housing 21 having a pressure chamber 22 formed therein, with a distribution base 23 secured thereto in a suitable manner to form a closure for the lower end of said pressure chamber. The base 23 is provided with a pilot disc seat 24. A conduit 25 communicates with the pressure chamber 22 for supplying operating fluid under pressure thereto. A pilot disc 26 is disposed in the pressure chamber 22 and its lower face 27 is engaged with the seat 24. A pilot shaft 28 has one end thereof projecting into the pressure chamber 22 and is connected with the pilot disc 26 and the opposite end thereof is disposed exteriorly of the pilot valve housing 21 and has a manually operable handle 29 secured thereto. A dial 30 is disposed beneath the handle 29 and bears the legends "Close," "Mid," and "Open". The movement of the handle 29 in opposite directions is limited by stop pins 30ª—30ª.

Figure 3:
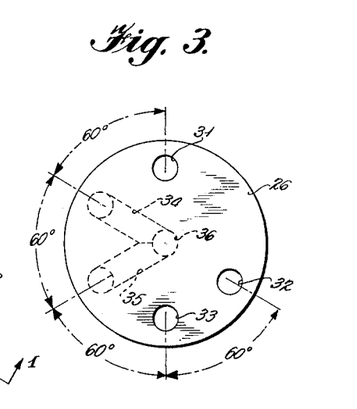
Fig. 3 is a diagrammatic plan view showing the porting of the pilot disc of the pilot valve shown in Fig. 1.

The pilot disc 26 (Fig. 3) is provided with three through or pressure ports 31, 32 and 33, respectively, the ports 31 and 33 lying on the same diametrical line and the port 32 lying on a radius at an angle of 60° to the right of port 33. The pilot disc 26 is also provided with two generally inverted U-shaped exhaust ports 34 and 35, respectively, both originating in a port 36 at the axial center of said pilot disc. The exhaust ports 34 and 35 are disposed on radii spaced 60° apart, the exhaust port 34 being disposed on a radius 60° from the pressure port 31 and the exhaust port 35 being disposed on a radius 60° from the pressure port 33. The exhaust port 35 opens at its outer end into the lower face 27 of the pilot disc 26, as best shown in Fig. 1, and the outer end of the exhaust port 34 is similarly arranged.

Figure 4:
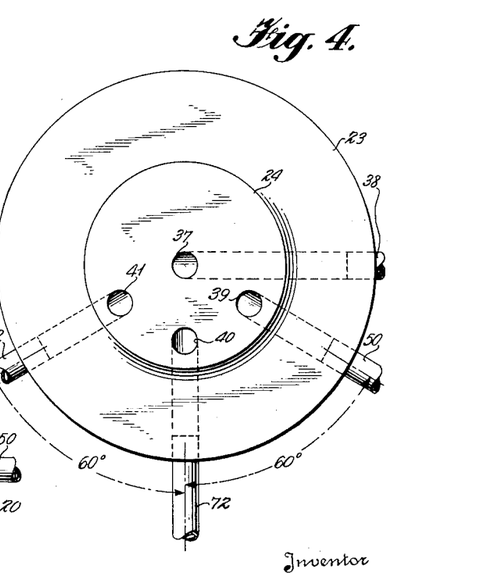
Fig. 4 is a diagrammatic plan view showing the porting of the seat and fluid distribution base of the pilot valve shown in Fig. 1.

The seat 24 (Figs. 1 and 4) of the pilot base 23 has an axial port 37 in constant communication with the axial port 36 of the pilot disc 26. The port 37 serves as an exhaust passage and has a drain conduit 38 in communication therewith. The seat 24 has three additional ports 39, 40 and 41 through which operating fluid is distributed to a conventional or suitable pressure fluid operated four-way valve 42 (Fig. 5) and to a conventional or suitable pressure fluid operated valve 43, serving as a pressure equalizing valve, as will be explained later.

Figure 5:
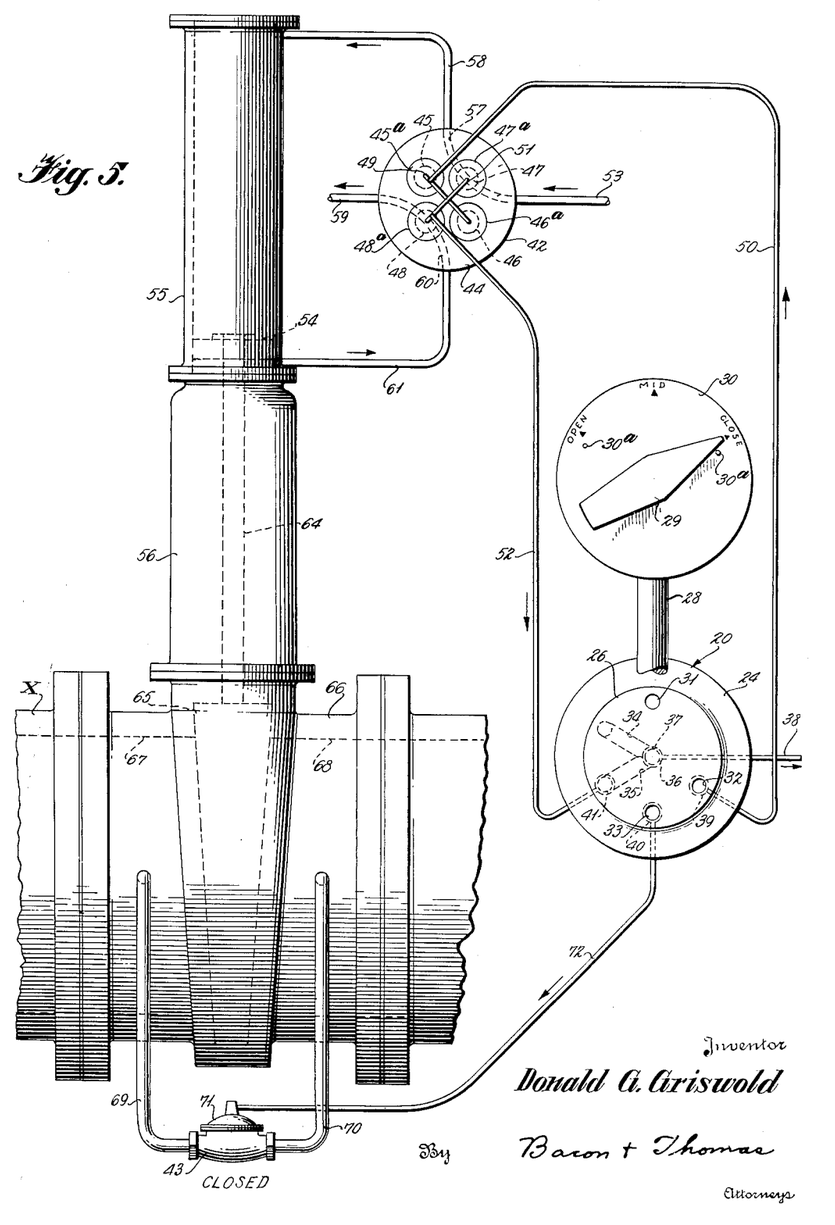
Fig. 5 is a diagrammatic view illustrating a cylinder operated main gate valve, a four-way valve, a pressure equalizing valve and the pilot valve handle in its "Close" position with the corresponding position of the pilot disc relative to its seat for actuating the four-way valve and pressure equalizing valve in a manner to maintain the main valve and pressure equalizing valve closed.

The conventional four-way valve 42 is diagrammatically illustrated in Fig. 5 and comprises a housing 44 containing diaphragm means (not shown) and four pressure fluid operable valves 45, 46, 47 and 48. The valves 45 and 46 are provided with pressure chambers 45ª and 46ª, respectively, which are interconnected by a tube 49. One end of a conduit 50 communicates with the tube 49 and its opposite end communicates with the port 39 of the pilot seat 24. The valves 47 and 48 are provided with pressure chambers 47ª and 48ª, respectively, which are interconnected by a tube 51. One end of a conduit 52 communicates with the tube 51 and its opposite end communicates with the port 41 of the pilot seat 24.

The housing 44 of the four-way valve 42 has an operating fluid supply pipe 53 connected therewith for supplying operating fluid under pressure to actuate a piston 54 in a cylinder 55 mounted upon a main or gate valve 56. The supply pipe 53 communicates with a passageway 57 in the housing 44, which in turn is connected by a pipe 58 with the upper end of the cylinder 55, the valve 47 being arranged to control the flow of operating fluid through the passageway 57. The housing 44 also has a drain pipe 59 connected therewith communicating with a passageway 60 in the housing 44 and a pipe 61 connects said passageway with the lower end of the cylinder 55. The valve 48 is connected in the passageway 60 to control the exhaust or discharge of operating fluid from the lower end of the cylinder 55 through the drain pipe 59.

The four-way valve 42 also has a passageway 62 (Fig. 7) controlled by the valve 46 for establishing communication between the operating fluid supply pipe 53 and the lower end of the cylinder 55 through the pipe 61. Still another passageway 63 in the housing 44 is controlled by the valve 45 to establish communication through the pipe 58 between the upper end of the cylinder 55 and the drain pipe 59 to exhaust fluid from the upper end of said cylinder.

The piston 54 within the cylinder 55 is connected to one end of a piston rod 64 and its opposite end is connected to a gate 65 slidably mounted in the body 66 of the main valve 56. The valve 56 is shown connected in a pipe line X and the body 66 thereof has an inlet chamber 67 on one side of the gate 65 and an outlet chamber 68 on the opposite side of said gate. The pressure equalizing valve 43, previously referred to, has one side thereof connected by a conduit 69 with the inlet chamber 67 and the opposite side thereof connected by a conduit 70 with the outlet chamber 68, whereby when the valve 43 is open while the gate 65 is still closed, fluid can be by-passed from the inlet chamber 67 to the outlet chamber 68 around the gate 65 to substantially equalize the pressures on the opposite sides of said gate to thereby relieve the side pressure or thrust on the inlet side of said gate. This bypass arrangement renders it possible to make the piston 54 and the cylinder 55 of a smaller size than would otherwise and normally be required to effect raising of the gate 65. The pressure equalizing valve 43, as has been previously stated, is a conventional or suitable fluid pressure operated valve and it includes a pressure chamber 71 which communicates with one end of a conduit 72 having its opposite end communicating with the port 40 in the pilot seat 24. Thus, it will be apparent from the foregoing that the pilot valve 20 simultaneously controls the operation of the four-way valve 42 and the pressure equalizing valve 43.

Fig. 5 diagrammatically illustrates the position of the pilot disc 26 relative to its seat 24 for maintaining the main valve 56 and the pressure equalizing valve 43 closed. In the interest of clarity, the ports of the seat 24 have been exaggerated in size in order to indicate registration of the ports of the pilot disc 26 therewith. Thus, when the main valve 56 is closed, the control handle 29 points to the legend "Close" on the dial plate 30. The pilot disc pressure port 32 then registers with the seat port 39 and operating fluid under pressure from the pressure chamber 22 of the pilot valve 20 is communicated through the conduit 50 and tube 49 to the pressure chambers 45ᵃ and 46ᵃ of the pair of valves 45 and 46 of the four-way valve 42, to maintain this pair of valves closed. At the same time, the pilot disc pressure port 33 registers with the seat port 40 and operating fluid under pressure is communicated through the conduit 72 to the pressure chamber 71 of the pressure equalizing valve 43 and said pressure equalizing valve is also maintained closed. In addition, the exhaust port 35 of the pilot disc 26 communicates at its outer end with the seat port 41 to connect the pressure chambers 47ᵃ and 48ᵃ of the pair of valves 47 and 48 with the atmosphere through the tube 51, the conduit 52, seat port 41, pilot disc exhaust port 35 and axial port 36, seat port 37 and the pilot valve drain conduit 38. Therefore, the pair of valves 47 and 48 are allowed to open, the valve 47 permitting pressure from the pipe 53 to be transmitted through the passageway 57 and the pipe 58 to the upper end of the cylinder 55 to maintain the piston 54 in its lowermost position. The opening of the valve 48 connects the lower end of the cylinder 55 with the drain pipe 59 through the pipe 61 and the passageway 60. Hence, the main gate valve 56 will remain closed so long as the control handle 29 remains in the "Close" position.

It will be understood from the foregoing that the pilot valve 20 controls the valves 47 and 48 of the four-way valve 52 so that they are operated simultaneously as one pair of valves and the valves 45 and 46 are operated simultaneously as another pair of valves, but that the valves 45 and 46 are maintained closed at the time that the valves 47 and 48 are open and vice versa. The valve 45 of the one pair would never normally be open at the same time that the valve 47, for example, of the other pair is open, so that the pairs of valves are operated in non-overlapping relation.

When it is desired to open the main gate valve 56, the control handle 29 is manually rotated 60° counterclockwise into the "Mid" position on the dial plate 30 and permitted to remain there for a short time prior to moving the same to the "Open" position of the dial. Accordingly, when the handle 29 is in its "Mid" position, the pilot disc 26 assumes a position relative to its seat 24 diagrammatically indicated in Fig. 6. It will be noted from this figure, that the pressure port 33 of the pilot disc 26 has been moved into registration with the seat port 39 so that operating fluid under pressure continues to be supplied through the conduit 50 to the tube 49 to the pressure chambers 45ᵃ and 46ᵃ to maintain the valves 45 and 46 of the four-way valve 42 closed, and that the exhaust port 34 has replaced the exhaust port 35 previously in registration with the seat port 41 so that the pressure chambers 47ᵃ and 48ᵃ of the valves 47 and 48 of the four-way valve 42 continue to remain open to the atmosphere or to exhaust through the conduit 52. Thus, no actual change has occurred, with respect to the pressure fluid supply and exhaust functions performed by the four-way valve 42, from that when the pilot disc 26 occupied the position shown in Fig. 5. However, the exhaust port 35 of the pilot disc 26 has replaced the pressure port 33 previously in registration with the seat port 40, so that the pressure chamber 71 of the pressure equalizing valve 43 is now open to the atmosphere or to exhaust through the conduit 72, seat port 40, pilot disc exhaust port 35 and port 36, seat port 37 and the pilot valve drain conduit 38. Hence, the pressure equalizing valve 43 is allowed to open and establish communication between the inlet chamber 67 and the outlet chamber 68 of the main valve 56 to substantially equalize the pressures on the opposite sides of the gate 65. These pressures will normally substantially equalize in a short time, so that the control handle 29 can be actuated to the "Open" position of the dial plate 30 to effect opening of the main valve 56.

Figure 7:
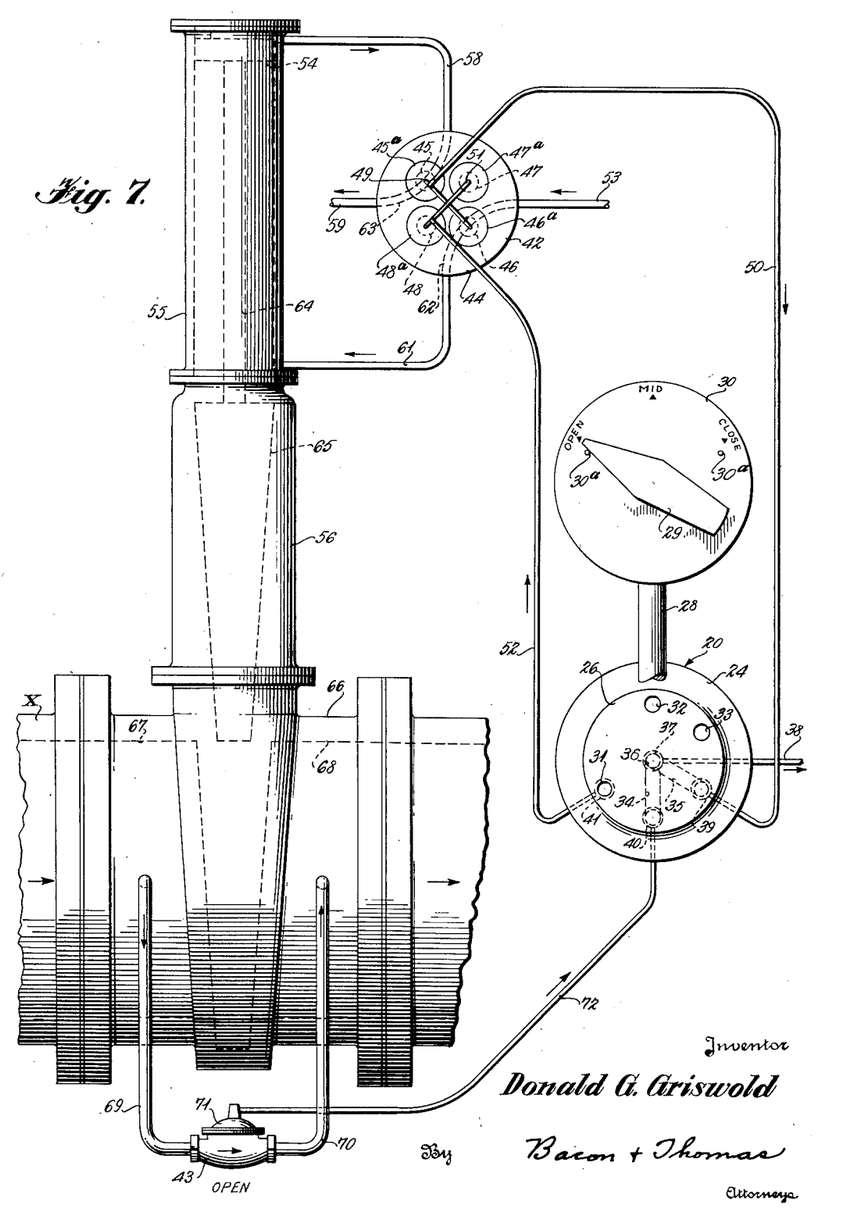
Fig. 7 is a diagrammatic view similar to Fig. 5, but showing the pilot valve handle in its "Open" position with the pilot disc in its corresponding position to effect opening of the main valve while permitting the pressure equalizing valve to remain open.

Fig. 7 illustrates the position of the pilot disc 26 relative to its seat 24 when the handle 29 has been rotated another 60° counterclockwise to its "Open" position. It will be noted therefrom that the exhaust port 34 of the pilot disc 26 now registers with the seat port 40 so that the pressure chamber 71 of the pressure equalizing valve 43 is connected with the atmosphere through the pilot valve 20 as before described and, therefore, continues to remain open. However, the pressure port 31 of the pilot disc 26 now registers with the seat port 41 so that operating fluid under pressure is transmitted through the conduit 52 and tube 51 to the pressure chambers 47ᵃ and 48ᵃ of the pair of valves 47 and 48, respectively, of the four-way valve 42 to effect closing of said pair of valves. Simultaneously, the exhaust port 35 of the pilot disc 32 registers with the seat port 39, permitting the fluid to exhaust from the pressure chambers 45ᵃ and 46ᵃ of the valves 45 and 46, respectively, through the tube 49, conduit 50, and the pilot valve 20 so that the valves 45 and 46 are allowed to open. The opening of the valve 46 permits operating fluid under pressure to flow from the supply pipe 53 through the passageway 62 and the pipe 61 into the lower end of the cylinder 55 to effect upward movement of the piston 54 therein to thus raise the gate 65 and open the main valve 56. The opening of the valve 45 permits the fluid forced out of the upper end of the cylinder 55 by the upward movement of the piston 54 to flow through the pipe 58 and the passageway 63 in the four-way valve 42 into the drain pipe 59. In short, when the control handle 29 is in the "Open" position, the pressure equalizing valve 43 remains open while the pair of valves 47 and 48 close and the pair of valves 45 and 46 open.

Should it be desired to close the main valve 56, it is only necessary to rotate the control handle 29 clockwise through an angle of 120° to position the same in the "Close" position on the dial plate 30. This will restore the pilot disc 26 to the position shown in Fig. 5, thereby effecting closing of the pressure equalizing valve 43, opening of the pair of valves 47 and 48 and closing of the pair of valves 45 and 46 of the four-way valve 42, thereby reversing the supply and exhaust of operating fluid to the cylinder 55 to effect downward movement of the piston 54 therein and lowering of the gate 65 into its closed position.

Instead of actuating the pilot valve 20 manually through the handle 29, the same can be actuated automatically to cause the main valve 56 to function, for example, as a relief valve, in response to changes in pressure in the inlet chamber 67 of said main valve. Thus, referring to Fig. 8, a pressure-responsive device 73 is connected by a conduit 74 with the inlet side 67 of the main valve 56. The conduit 74 transmits the pressure from the inlet chamber 67 to a chamber 75 at one side of a flexible diaphragm 76. Such pressure is opposed by a spring 77 acting against the opposite side of the diaphragm 76 to oppose flexing movement of said diaphragm toward the right until the pressure in the inlet chamber 67 of the main valve 56 exceeds a predetermined value. A rod 78 is connected at its inner end with the diaphragm 76 and its outer end carries a gear rack 79, which meshes with a pinion 80 mounted upon the outer end of the pilot shaft 28 in lieu of the handle 29. A collar 81 on the rod 78 limits shifting of said rod toward the left by the spring 77 and positions the pilot disc 26 in its "Close" position corresponding to Fig. 5.

Figure 6:
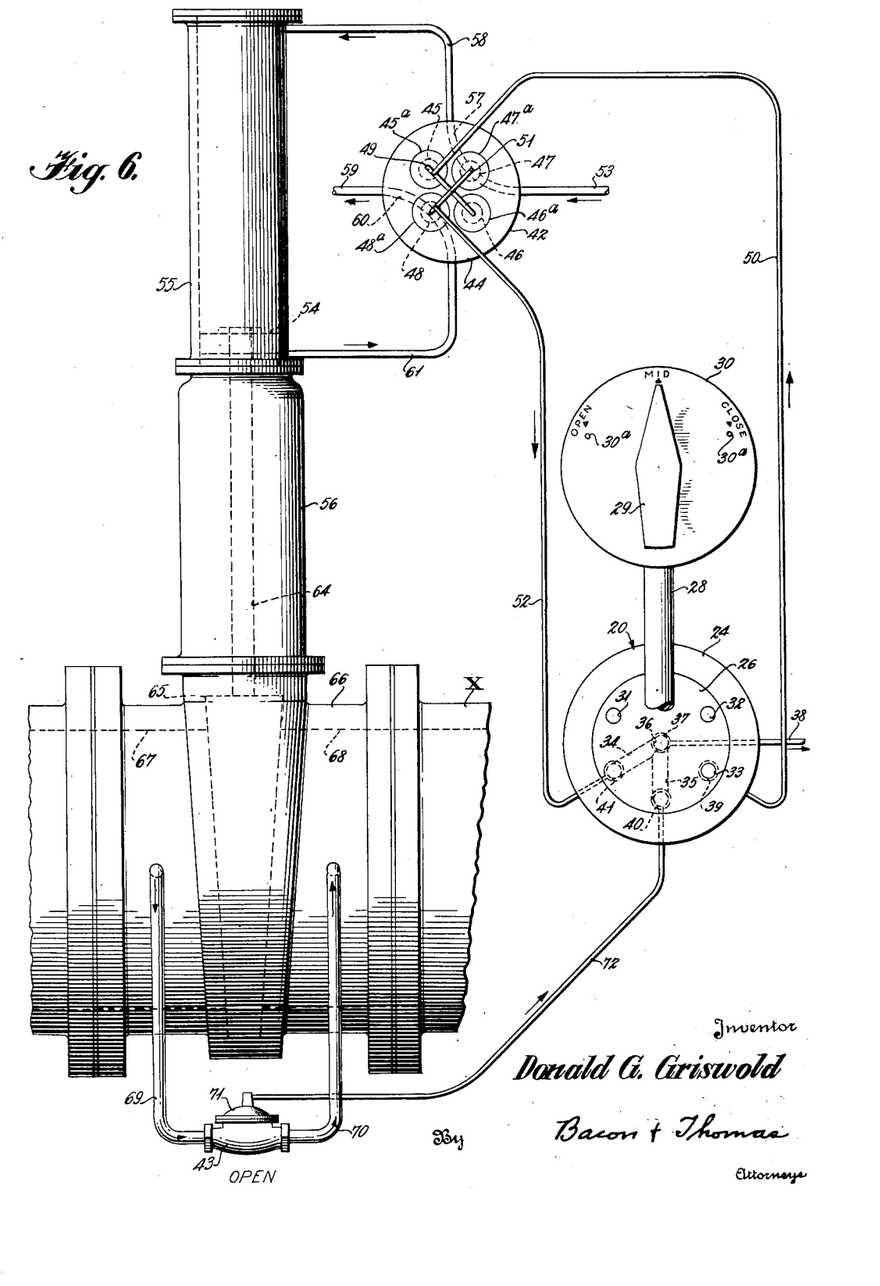
Fig. 6 is a diagrammatic view similar to Fig. 5, but showing the pilot valve handle in its "Mid" position with the pilot disc in its corresponding intermediate position relative to its seat, wherein opening of the pressure equalizing valve is effected while the main valve is held closed to substantially balance the pressures on the opposite sides of the gate of said main valve.
Figure 8:
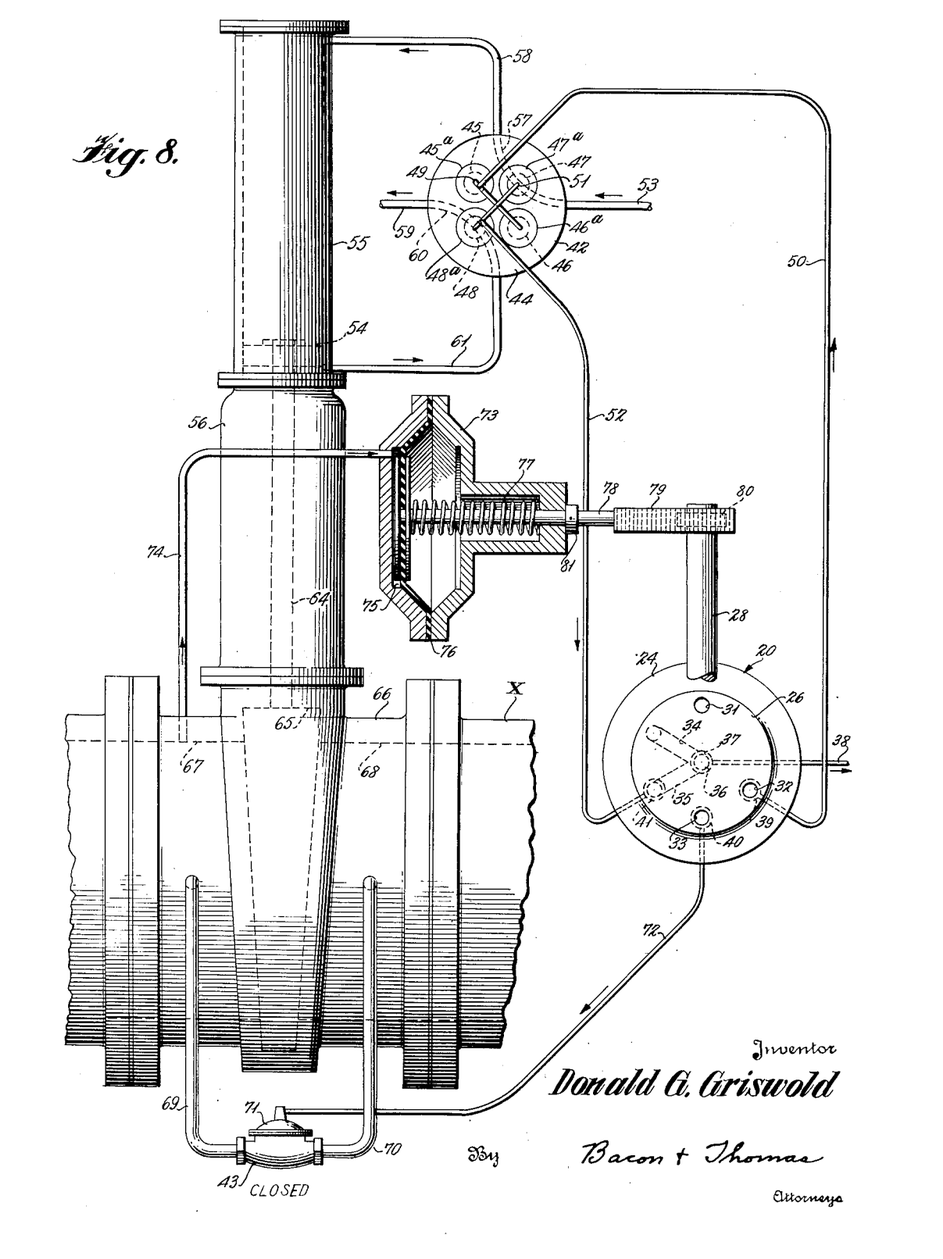
Fig. 8 is a diagrammatic view of a main valve, a four-way valve, and a pressure equalizing valve associated with an automatically operated pilot valve for controlling the opening and closing of the main valve in accordance with pressure changes on the inlet side of said main valve.

It will be apparent from Fig. 8 that, as the pressure builds up in the inlet chamber 67 of the main valve 56 to an extent sufficient to overcome the force exerted by the spring 77, the rod 78 will be shifted toward the right and the rack 79 will turn the pinion 80 and the shaft 28 and the pilot disc 26 associated therewith in a counterclockwise direction, first positioning said pilot disc 26 in its "Mid" or intermediate position corresponding to that shown in Fig. 6 to effect opening of the pressure equalizing valve 43 to balance the pressure on the opposite sides of the gate 65 and to thereafter, if the pressure continues to build up, position the pilot disc 26 in its "Open" position corresponding to the position shown in Fig. 7 to effect opening of the main valve 56. After the excess pressure on the inlet side 67 of the main valve 56 has been relieved, the spring 77 will flex the diaphragm 76 toward the left, effecting return movement of the pilot disc 26 in a clockwise direction through the rack 79, pinion 80 and shaft 28 to restore the same to the position shown in Fig. 8, whereby to effect closing of said main valve.

Figs. 9 to 12, inclusive, diagrammatically illustrate a pilot valve 120 differing from the pilot valve 20 shown in Figs. 1 to 4, inclusive, in that it is especially provided with a "Lock" position to hold the main valve 56 locked in any desired open position between closed and wide open. Thus, the pilot valve 120 includes a housing 121 having a pressure chamber 122 formed therein with a distribution base 123 suitably secured thereto in a manner to form a closure for the lower end of said pressure chamber. The base 123 is provided with a pilot disc seat 124. A conduit 125 communicates with the pressure chamber 122 to supply operating fluid under pressure thereto. A pilot disc 126 is disposed in the pressure chamber 122 and its lower face 127 is engaged with the seat 124. A pilot shaft 128 has one end thereof projecting into the pressure chamber 122 and connected with the pilot disc 126 and the opposite end thereof disposed exteriorly of the pilot valve housing 121 and having a manually operable handle 129 secured thereto. A dial plate 130 is disposed beneath the handle 129 and bears the legends reading from left to right "Open," "Lock," "Mid," and "Close." Pins 130ᵃ carried by the plate 130 limit movement of the handle 129 in opposite directions.

Figures 9, 10, 11, 12:
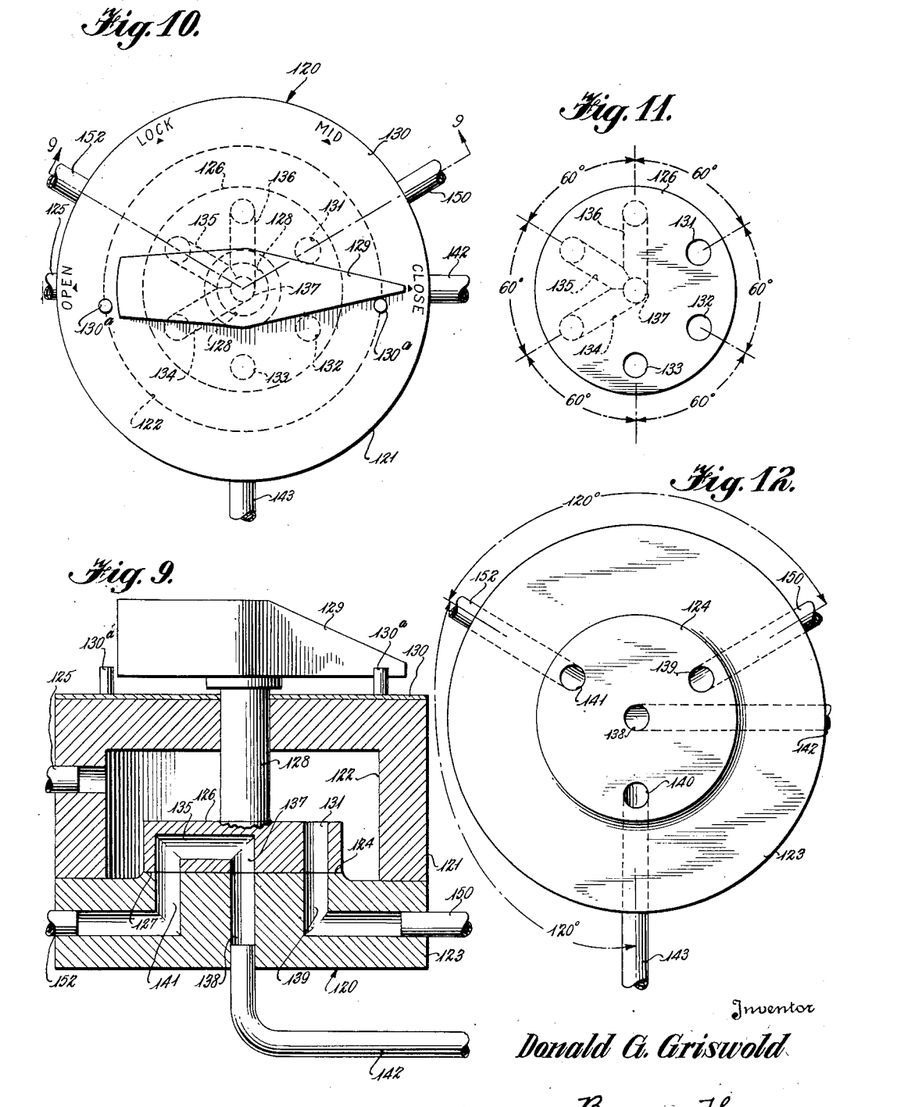
Fig. 9 is a diagrammatic sectional view of a modified form of manually operated pilot taken on the line 9—9 of Fig. 10 and having all of the features of the pilot valve shown in Figs. 1 to 4, inclusive, and the additional feature of a "Lock" position of the handle to enable the gate of the main valve to be positively locked in any desired open position of adjustment.
Fig. 10 is a plan view of the pilot valve shown in Fig. 9.
Fig. 11 is a diagrammatic plan view showing the porting of the pilot disc of the pilot valve shown in Fig. 9.
Fig. 12 is a diagrammatic plan view showing the porting of the seat and fluid distribution base of the pilot valve shown in Fig. 9.

The pilot disc 126 is provided with three through or pressure ports 131, 132 and 133, respectively; and three generally inverted U-shaped exhaust ports 134, 135 and 136, respectively, all originating in a port 137 at the axial center of said pilot disc. The ports 131–136, inclusive, are arranged upon radii spaced 60° apart, and each of the exhaust ports 134, 135 and 136 opens at its outer end into the lower face 127 of the pilot disc 126.

The pilot disc seat 124 has an axial port 138 in constant communication with the axial port 137 of the pilot disc 126. The seat 124 has three additional ports 139, 140 and 141 arranged upon radii spaced 120° apart. The central port 138 communicates with an exhaust or drain conduit 142. The seat port 140 is connected by a conduit 143 (Fig. 13) with the pressure chamber 71 of the pressure equalizing valve 43. The seat port 139 is connected by a conduit 150 with the tube 49 of the four-way valve 42, and a conduit 152 connects the seat port 141 with the tube 51 of said four-way valve.

Figure 13:
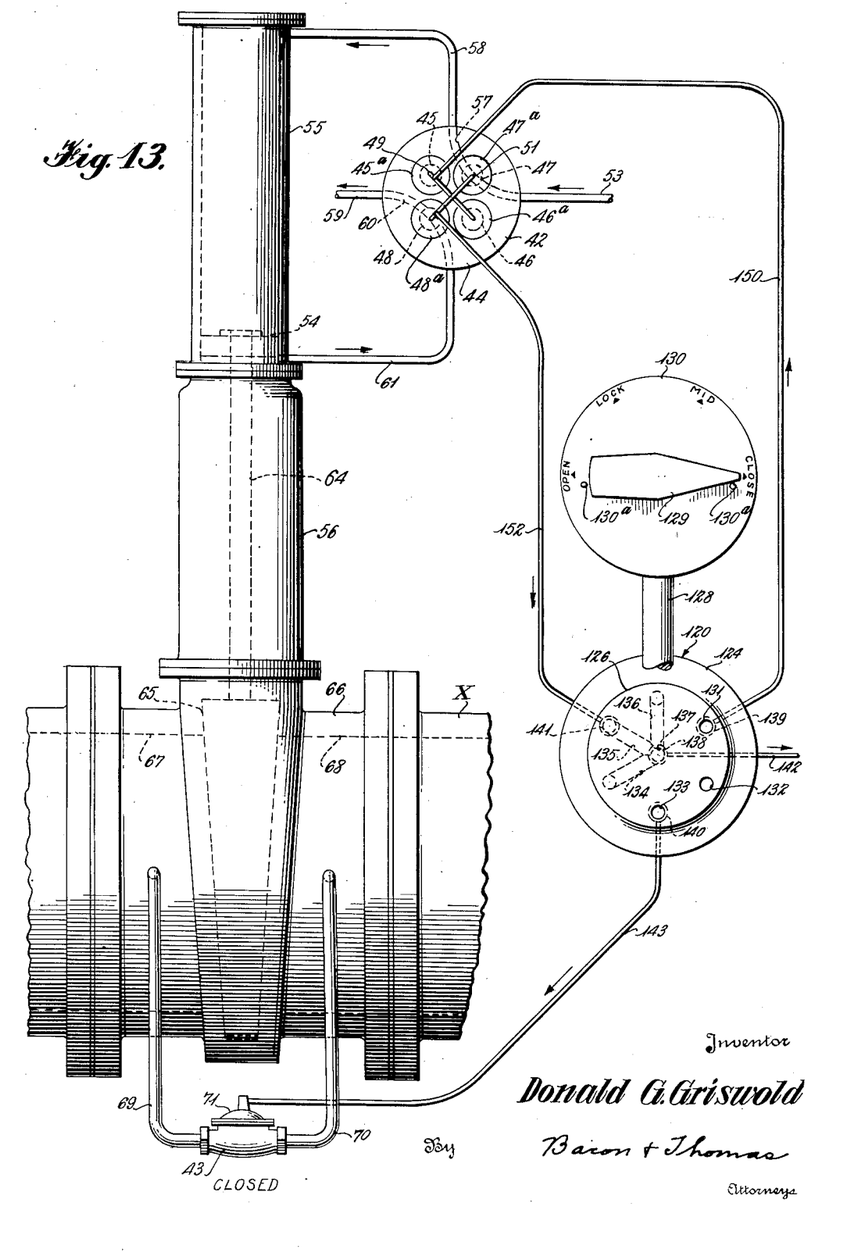
Fig. 13 is a diagrammatic view illustrating the manner in which the pilot valve of Figs. 9 to 12, inclusive, is associated with a main valve, a four-way valve, and a pressure equalizing valve for manually controlling the operation of the main valve, the pilot valve handle being shown in its "Close" position and the pilot disc being shown in its corresponding position relative to its seat for maintaining the main valve and pressure equalizing valve closed.

Fig. 13 illustrates the position of the pilot disc 126 corresponding to the registration of the handle 129 with the "Close" position of the dial 130. In such position, the pressure port 133 of the pilot disc 126 registers with the seat port 140 and pressure is maintained in the chamber 71 of the pressure equalizing valve 43 through the conduit 143 to hold said pressure equalizing valve closed.

Simultaneously, the port 131 of the pilot disc 126 registers with the seat port 139 and pressure is communicated to the pressure chambers 45ᵃ and 46ᵃ of the valves 45 and 46 to maintain the same closed, while the exhaust port 135 of said pilot disc registers with the seat port 141 to exhaust operating fluid from the pressure chambers 47ᵃ and 48ᵃ of the valves 47 and 48, so that insofar as the pressure equalizing valve 43 and the four-way valve 42 are concerned, they are in the same condition as that described hereinbefore in connection with Fig. 5, and the main valve 56 is held closed.

Figure 14:
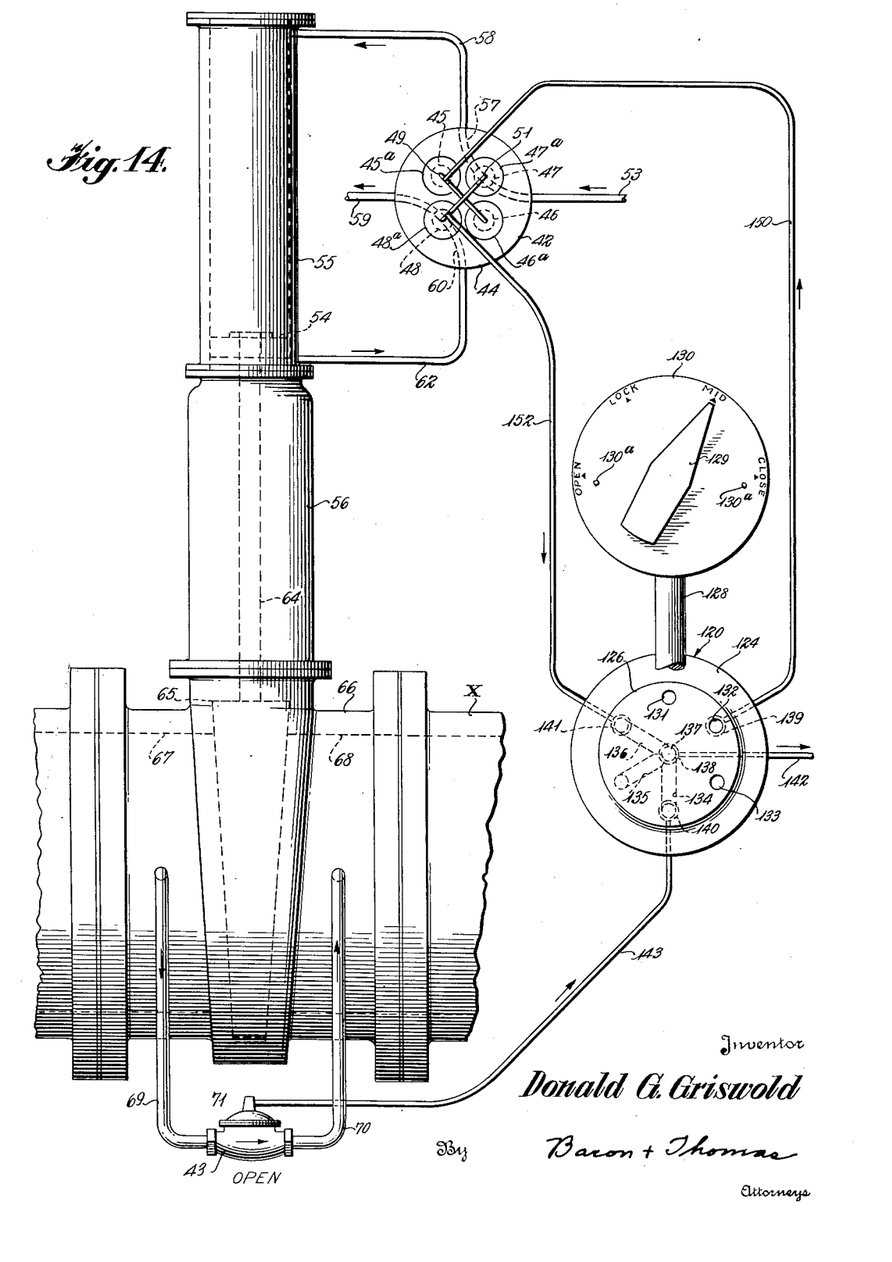
Fig. 14 is a view similar to Fig. 13, but showing the pilot valve handle in its "Mid" position with the pilot disc in the corresponding position it assumes relative to its seat wherein the main valve is held closed and opening of the pressure equalizing valve is effected to balance the pressures on the opposite sides of the gate of said main valve.
Figure 15:
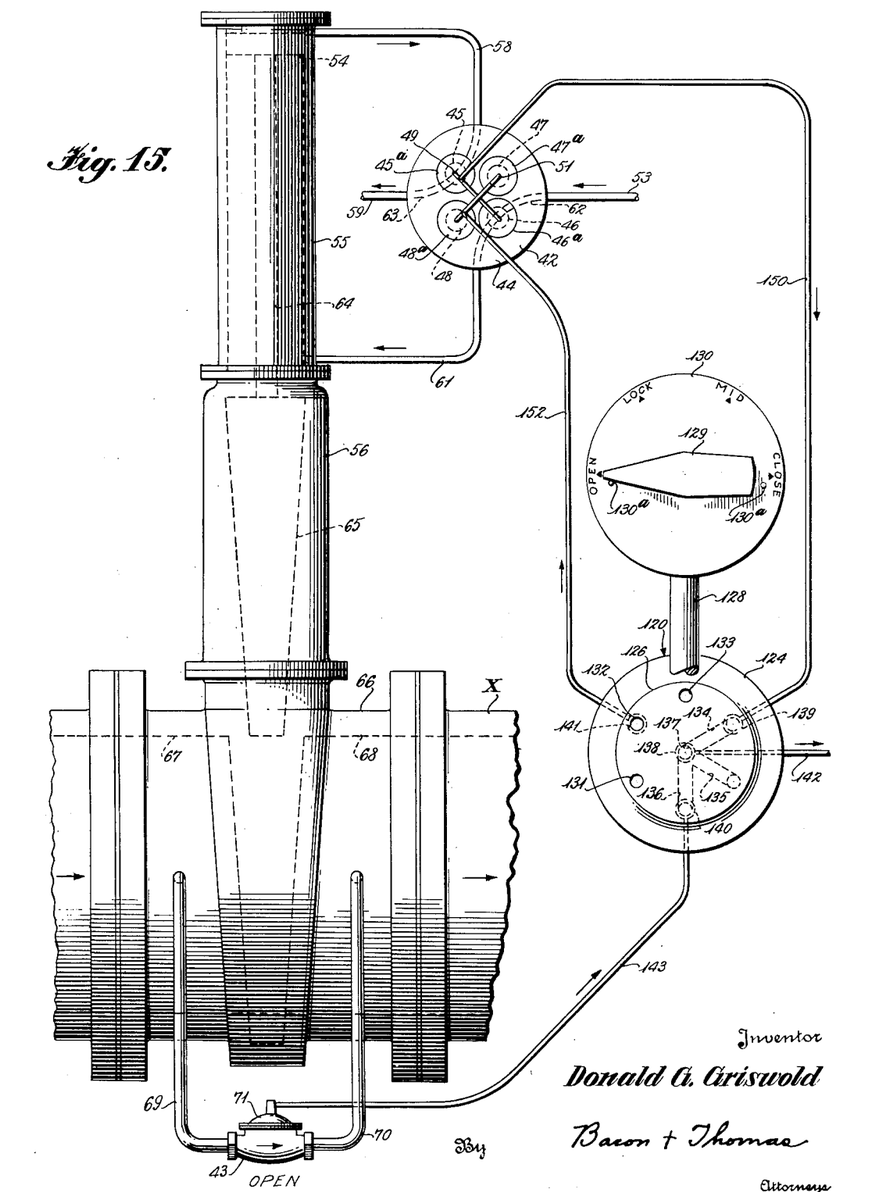
Fig. 15 is a diagrammatic view similar to Fig. 13 but illustrating the pilot valve handle in its "Open" position and the pilot disc in its corresponding position relative to its seat wherein both the main gate valve and the pressure equalizing valve are open.

Fig. 14 illustrates the control handle 129 after it has been manually moved counterclockwise through an angle of 60° into registration with the "Mid" position of the dial 130. The 60° movement of the handle 129 will have rotated the pilot shaft 128 and the pilot disc 126 to a position such that the pilot disc port 132 registers with the seat port 139 and the outer end of the exhaust port 136 registers with the seat port 141 so that no change in the pressure and exhaust conditions occurs in the four-way valve 42, and hence, the main valve 56 remains closed. However, the outer end of the exhaust port 134 now registers with the seat port 140 and operating fluid is allowed to exhaust to the atmosphere from the pressure chamber 71 of the pressure equalizing valve 43 through conduit 143, seat port 140, pilot disc ports 134 and 137, seat port 138 and the drain conduit 142 thereby permitting said pressure equalizing valve to open and thus substantially equalize the pressures in the inlet chamber 67 and the outlet chamber 68 on the opposite sides of the gate 65. If the opening of the pressure equalizing valve 43 is sufficient to meet the line demand, then the handle 129 may be permitted to remain in its "Mid" position. However, if opening of the main valve 56 is required, then the handle 129 is rotated counterclockwise through an angle of 120° past the "Lock" position, into abutment with the stop pin 130ᵃ and into registration with the "Open" position of the dial 130, as illustrated in Fig. 15. The pilot disc 126 then assumes a position relative to its seat 124, in which the exhaust port 136 registers with the seat port 140 so that the pressure chamber 71 of the pressure equalizing valve 43 remains open to exhaust and, of course, said pressure equalizing valve remains open. On the other hand, the pressure and exhaust conditions in the four-way valve 42 have been reversed. That is to say, the outer end of the exhaust port 134 of the pilot disc 126 now registers with the seat port 139 and effects the exhaust of spent operating fluid from the pressure chambers 45ᵃ and 46ᵃ of the valves 45 and 46 through the tube 49 and conduit 150, thereby allowing the valves 45 and 46 to open. At the same time, the pilot disc port 132 registers with the seat port 141 and fluid under pressure is admitted to the pressure chambers 47ᵃ and 48ᵃ of the valves 47 and 48 and these valves are held closed. The opening of the valve 45 permits the exhaust of fluid from the upper end of the cylinder 55 through the pipe 58, passageway 63 in the four-way valve 42, and the drain pipe 59. Simultaneously, opening of the valve 46 effects the admission of operating fluid under pressure into the lower end of the cylinder 55 from the supply pipe 53, through the passageway 62 in the four-way valve 42, and the pipe 61. The admission of operating fluid under pressure into the lower end of the cylinder 55 forces the piston 54 upwardly, thereby raising the gate 65 to allow flow through the main valve 56. Hence, the four-way valve 42 and the pressure equalizing valve 43 are in the same condition for effecting opening of the main valve 56 as in Fig. 7.

Figure 16:
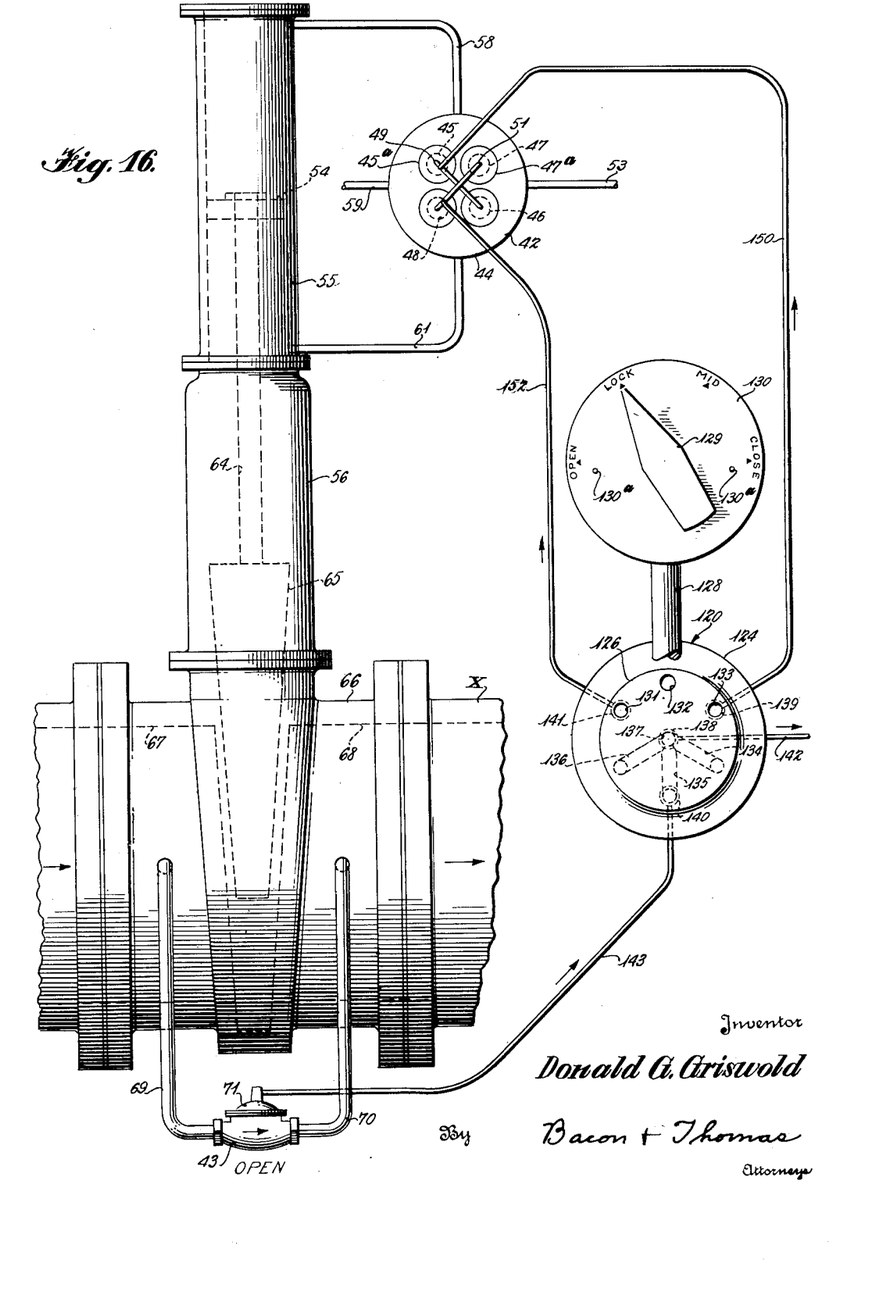
Fig. 16 is a diagrammatic view similar to Fig. 13 showing the pilot valve handle in its "Lock" position with the pilot disc in the corresponding position it assumes for positively locking the gate of the main valve in a partially open position while permitting the pressure equalizing valve to remain open.

Should it be desired to only partially open the main valve 56, and to maintain the gate 65 locked in a partially open position, then the handle 129 is permitted to register with the "Open" position of the dial 130 until the main valve 156 is opened to the extent desired, and is then moved clockwise from said "Open" position through an angle of 60° to register with the "Lock" position of the dial 130, as illustrated in Fig. 16.

It will be noted from Fig. 16 that when the handle 129 is in its "Lock" position, the pressure port 133 of the pilot disc 126 registers with the seat port 139 and operating fluid under pressure is effective through the conduit 150 and tube 49 to maintain the valves 45 and 46 closed. The pressure port 131 of the pilot disc 126 registers with the seat port 141 so that operating fluid under pressure is effective through the conduit 152 and tube 51 to maintain the valves 47 and 48 closed. Accordingly, the valves 45-48, inclusive, of the four-way valve 42 are all now held closed and operating fluid under pressure can neither enter nor leave the cylinder 55 and the piston 54, therefore, is held stationary in whichever position it was in at the time that the handle 129 was turned to the "Lock" position. However, the outer end of the exhaust port 135 of the pilot disc 126 registers with the seat port 140 and the pressure equalizing valve 43 remains open to exhaust through the conduits 143 and 142. In other words, the pressure equalizing valve 43 remains in the same condition it was in at the time that the handle 129 registered with the "Open" position of the dial 130.

The gate 65 of the main valve 56 can be operated to further open said main valve or to close said main valve simply by manipulating the handle 129 to either the "Open" position or the "Close" position on the dial 130. Alternatively, of course, the main valve 56 can be opened further and locked in the further opened position by manipulating the handle from the "Lock" position of the dial 130 to the "Open" position, and then returning it to said "Lock" position when the gate has reached the desired open position of adjustment. A complete closing of the main valve 56 can be effected at any time by positioning the handle 129 in registration with the "Close" position of the dial 130 and allowing it to remain in such position.

It will be understood that various changes may be made in the details of construction and arrangement of the pilot valve and the associated valves shown herein for controlling the main valve, to effect either manual or automatic operation, and that a reversible fluid motor can be substituted for the cylinder shown herein, without departing from the spirit of the invention or the scope of the annexed claims.

I claim:

1. In combination: a main valve of large capacity; a valve of relatively small capacity; means connecting said valve of small capacity in by-passing relation with said main valve; and remote control means, including a single manually operable control member, for simultaneously controlling both of said valves so constructed and arranged as to maintain said main and small valves closed when said control member is in one position, maintain said main valve closed while effecting opening of said small valve to substantially balance the pressures on the opposite sides of said closed main valve when said control member is in another position, and to thereafter effect opening of said main valve when said control member is in still another position.

2. In combination: a main valve of large capacity; a valve of relatively small capacity; means connecting said valve of small capacity in by-passing relation with said main valve; and control means including a manually operable pilot valve for simultaneously controlling both of said aforementioned valves so constructed and arranged as to maintain said main and small valves closed in one operative position of said pilot valve, maintain said main valve closed while effecting opening of said small valve to substantially balance the pressures on the opposite sides of said closed main valve in another operative position of said pilot valve, and to thereafter effect opening of said main valve in still another position of said pilot valve.

3. In combination: a main valve of large capacity; a valve of relatively small capacity; means connecting said valve of small capacity in by-passing relation with said main valve; and control means including an element responsive to changes in pressure on one side of said main valve for simultaneously controlling both of said valves and being so constructed and arranged as to maintain said main and small valves closed when said element is in one operative position, maintain said main valve closed while effecting opening of said small valve to substantially balance the pressures on the opposite sides of said closed main valve when said element is in another operative position, and to thereafter effect opening of said main valve while allowing said by-passing valve to remain open when said element is in still another operative position.

4. In combination: a main valve; a pressure equalizing valve; means connecting said pressure equalizing valve in by-passing relation with said main valve; fluid pressure operable means for actuating said main valve and pressure equalizing valve, respectively; and a pilot valve connected with both of said fluid pressure operable means to simultaneously control the operation thereof, said pilot valve having a "Close" position in which said fluid pressure operable means are controlled to maintain said main and pressure equalizing valves closed, a "Mid" position in which said fluid pressure operable means are controlled to maintain said main valve closed and to permit said pressure equalizing valve to open to substantially balance the pressures on the opposite sides of said main valve, and an "Open" position in which said fluid pressure operable means are controlled to permit said pressure equalizing valve to remain open and to effect opening of said main valve.

5. In combination: a main valve; a pressure equalizing valve; means connecting said pressure equalizing valve in by-passing relation with said main valve; fluid pressure operable means for actuating said main valve and pressure equalizing valve, respectively; and a pilot valve connected with both of said fluid pressure operable means to simultaneously control the operation thereof, said pilot valve having a "Close" position in which said fluid pressure operable means are controlled to maintain said main and pressure equalizing valves closed, a "Mid" position in which said fluid pressure operable means are controlled to maintain said main valve closed and to permit said pressure equalizing valve to open to substantially balance the pressures on the opposite sides of said main valve, an "Open" position in which said fluid pressure operable means are controlled to permit said pressure equalizing valve to remain open and to effect opening of said main valve, and a "Lock" position in which said fluid pressure operable means are controlled to maintain said pressure equalizing valve open and to maintain said main valve open to any desired extent.

6. In combination: a large main valve and a relatively small pressure equalizing valve; means connecting said pressure equalizing valve in by-passing relation with said main valve; fluid pressure operable means for actuating said main valve and pressure equalizing valve, respectively; and a pilot valve connected with said fluid pressure operable means to simultaneously control the operation thereof, said pilot valve having a first position in which said fluid pressure operable means are controlled to maintain said main and pressure equalizing valves closed, a second position in which said fluid pressure operable means are controlled to maintain said main valve closed and to permit said pressure equalizing valve to open to substantially balance the pressures on the opposite sides of said main valve, a third position in which said fluid pressure operable means are controlled to permit said pressure equalizing valve to remain open, and to effect opening of said main valve, and a fourth position intermediate said first and third positions in which one of said fluid pressure operable means is controlled to maintain said main valve locked in any desired open position.

7. The combination comprising: a large main valve having an inlet chamber, an outlet chamber, a movable closure member between said chambers, and fluid pressure operable means for actuating said closure member; a fluid pressure operable pressure equalizing valve of relatively smaller size than said main valve; means connecting said pressure equalizing valve in by-passing relation with said main valve, said pressure equalizing valve when open establishing communication between said inlet and said outlet chambers of said main valve to substantially balance the pressures on the opposite sides of said closure member even though said closure member is in closed position; fluid pressure operable valve means connected with said fluid pressure operable means of said main valve for controlling the supply and exhaust of operating fluid thereto; and a pilot valve connected with said fluid pressure operable valve means and with said fluid pressure operable pressure equalizing valve for controlling the operation thereof, said pilot valve having ports arranged to effect opening of said pressure equalizing valve to substantially balance the pressures on the opposite sides of said closure member of said main valve prior to actuating said valve means to operate said fluid pressure operable means of said main valve to effect movement of said closure member to an open position.

8. The combination comprising: a large main valve having an inlet chamber, an outlet chamber, a movable closure member between said chambers, and fluid pressure operable means for actuating said closure member; a fluid pressure operable pressure equalizing valve of relatively smaller size than said main valve arranged so that when it is open and said closure member is in closed position it establishes communication between said inlet and said outlet chambers of said main valve to substantially balance the pressures on the opposite sides of said closure member; a fluid pressure operable four-way valve connected with said fluid pressure operable means of said main valve for controlling the supply and exhaust of operating fluid thereto; and a pilot valve connected with said four-way valve and with said fluid pressure operable pressure equalizing valve for controlling the operation thereof, said pilot valve having ports arranged to effect opening of said pressure equalizing valve to substantially balance the pressures on the opposite sides of said closure member of said main valve prior to actuating said four-way valve to operate said fluid pressure operable means of said main valve to effect movement of said closure member to an open position.

9. The combination comprising: a large main valve having an inlet chamber, an outlet chamber, a movable closure member between said chambers, and fluid pressure operable means for actuating said closure member; a fluid pressure operable pressure equalizing valve of relatively smaller size than said main valve arranged so that when it is open and said closure member is in closed position it establishes communication between said inlet and said outlet chambers of said main valve to substantially balance the pressures on the opposite sides of said closure member; a fluid pressure operable four-way valve connected with said fluid pressure operable means of said main valve for controlling the supply and exhaust of operating fluid thereto; and a pilot valve connected with said four-way valve and with said fluid pressure operable pressure equalizing valve for controlling the operation thereof, said pilot valve having ports arranged to effect closing of said pressure equalizing valve and to simultaneously actuate said four-way valve to operate said fluid pressure operable means of said main valve to effect movement of said closure member to a closed position.

10. In combination: a gate valve having an inlet chamber, an outlet chamber, and a movable gate between said chambers; means for operating said gate including a cylinder, a piston in said cylinder, and a rod connecting said piston with said gate; a four-way valve having operating fluid supply and exhaust pipes connected thereto and containing passageways and four pressure fluid operable valves arranged to operate in pairs to control the flow through said passageways; pipes connecting said four-way valve with the opposite ends of said cylinder; a fluid pressure operable pressure equalizing valve of a relatively smaller size than said gate valve, said pressure equalizing valve having inlet and outlet chambers, a closure member between said chambers, and pressure chamber means for actuating said closure member; means connecting said inlet chamber of said pressure equalizing valve with said inlet chamber of said gate valve and means connecting said outlet chamber of said pressure equalizing valve with said outlet chamber of said gate valve, whereby when said main valve is closed and said pressure equalizing valve is opened it establishes communication between said inlet and said outlet chambers of said gate valve to substantially balance the pressures on the opposite sides of said gate; a pilot valve; separate conduit means connecting said pilot valve with each pair of pressure fluid operable valves of said four-way valve; and a conduit connecting said pilot valve with said pressure chamber means of said pressure equalizing valve for controlling the operation of said pressure equalizing valve, said pilot valve having ports arranged to actuate the valves of said four-way valve to maintain said main and pressure equalizing valves closed, and having ports arranged to actuate the valves of said four-way valve to maintain said main valve closed while effecting opening of said pressure equalizing valve to substantially balance the pressures on the opposite sides of said gate of said closed main valve, and also having ports for actuating the valves of said four-way valve to thereafter effect movement of said gate from a closed to an open position.

11. In combination: a gate valve having an inlet chamber, an outlet chamber, and a movable gate between said chambers; means for operating said gate including a cylinder, a piston in said cylinder, and a rod connecting said piston with said gate; a four-way valve having operating fluid supply and exhaust pipes connected thereto and containing passageways and four pressure fluid operable valves arranged to operate in pairs to control the flow through said passageways; pipes connecting said four-way valve with the opposite ends of said cylinder; a fluid pressure operable pressure equalizing valve of a relatively smaller size than said gate valve, said pressure equalizing valve having inlet and outlet chambers, a closure member between said chambers, and pressure chamber means for actuating said closure member; means connecting said inlet chamber of said pressure equalizing valve with said inlet chamber of said gate valve and means connecting said outlet chamber of said pressure equalizing valve with said outlet chamber of said gate valve, whereby when said main valve is closed and said pressure equalizing valve is opened it establishes communication between said inlet and said outlet chambers of said gate valve to substantially balance the pressures on the opposite sides of said gate; a pilot valve; separate conduit means connecting said pilot valve with each pair of pressure fluid operable valves of said four-way valve; a conduit connecting said pilot valve with said pressure chamber means of said pressure equalizing valve for controlling the operation of said pressure equalizing valve, said pilot valve having ports arranged to actuate the valves of said four-way valve to maintain said main and pressure equalizing valves closed, and having ports arranged to actuate the valves of said four-way valve to maintain said main valve closed while effecting opening of said pressure equalizing valve to substantially balance the pressures on the opposite sides of said gate of said closed main valve, and also having ports for actuating the valves of said four-way valve to thereafter effect movement of said gate from a closed to an open position; and pressure-responsive means connected with said pilot valve to actuate said pilot valve.

12. In combination: a large gate valve having an inlet chamber, an outlet chamber, and a movable gate between said chambers; means for operating said gate including a cylinder, a piston in said cylinder, and a rod connecting said piston with said gate; a four-way valve having operating fluid supply and exhaust pipes connected thereto and containing passageways and four pressure fluid operable valves arranged to operate in pairs to control the flow through said passageways; pipes connecting said four-way valve with the opposite ends of said cylinder; a fluid pressure operable pressure equalizing valve of a relatively smaller size than said gate valve, said pressure equalizing valve having inlet and outlet chambers, a closure member between said chambers, and pressure chamber means for actuating said closure member; means connecting said inlet chamber of said pressure equalizing valve with the inlet chamber of said gate valve and means connecting said outlet chamber of said pressure equalizing valve with said outlet chamber of said gate valve, whereby when said main valve is closed and said pressure equalizing valve is opened it establishes communication between said inlet and said outlet chambers of said gate valve to substantially balance the pressures on the opposite sides of said gate; a pilot valve including a pilot disc and a seat, said seat having a central exhaust port and three radially spaced ports; a conduit connecting one of said radially spaced seat ports with one of said pairs of pressure fluid operable valves of said four-way valve and a second conduit connecting another of said radially spaced seat ports with the other pair of pressure fluid operable valves; and a third conduit connecting the remaining radially spaced seat port with said pressure chamber means of said pressure equalizing valve for controlling the operation of said pressure equalizing valve, said pilot disc having ports cooperable with said seat ports arranged to control the distribution of operating fluid under pressure to actuate the valves of said four-way valve to maintain said main valve closed and to actuate said pressure equalizing valve to maintain it closed, to actuate the valves of said four-way valve to maintain said main valve closed while effecting opening of said pressure equalizing valve to substantially balance the pressures on the opposite sides of said gate of said closed main valve, and for actuating the valves of said four-way valve to thereafter effect movement of said gate from a closed to an open position.

DONALD G. GRISWOLD.

REFERENCES CITED

The following references are of record in the file of this patent:

UNITED STATES PATENTS

| Number | Name | Date |
|---|---|---|
| 336,724 | Lamb | Feb. 23, 1886 |
| 416,948 | Pratt et al. | Dec. 10, 1889 |
| 1,190,681 | Spitzer | July 11, 1916 |
| 1,550,717 | Towle | Aug. 25, 1925 |
| 2,295,667 | Kinzie | Sept. 15, 1942 |
| 2,377,227 | Griswold | May 29, 1945 |